US006841236B2

(12) United States Patent
Pavelka et al.

(10) Patent No.: US 6,841,236 B2
(45) Date of Patent: Jan. 11, 2005

(54) ARTICLES CONTAINING THIOXANTHONE DYES

(75) Inventors: Lee A. Pavelka, Cottage Grove, MN (US); David B. Olson, Marine on St. Croix, MN (US); R. Ellen Harelstad, Woodbury, MN (US); David M. Burns, Woodbury, MN (US)

(73) Assignee: 3M Innovative Properties Co., St. Paul, MN (US)

(*) Notice: Subject to any disclaimer, the term of this patent is extended or adjusted under 35 U.S.C. 154(b) by 365 days.

(21) Appl. No.: 09/934,427

(22) Filed: Aug. 20, 2001

(65) Prior Publication Data

US 2003/0077451 A1 Apr. 24, 2003

(51) Int. Cl.$^7$ .................................................. B32B 5/16
(52) U.S. Cl. ....................... 428/323; 428/207; 428/412; 428/423.1; 428/480; 428/521; 549/41
(58) Field of Search ................................ 428/323, 412, 428/423.1, 480, 521, 207; 549/41

(56) References Cited

U.S. PATENT DOCUMENTS

| 3,356,687 A | 12/1967 | Fuchs et al. |
| 3,785,989 A | 1/1974 | Noetzel et al. |
| 3,828,072 A | 8/1974 | Spietschka et al. |
| 3,829,439 A | 8/1974 | Spietschka et al. |
| 4,036,859 A | 7/1977 | Ribaldone et al. |
| 4,116,923 A | 9/1978 | Gattner et al. |
| 4,740,604 A | 4/1988 | Weis et al. |
| 5,280,128 A | 1/1994 | Bauer et al. |
| 5,415,669 A | 5/1995 | Buhler et al. |
| 6,110,566 A | 8/2000 | White et al. |
| 6,531,613 B1 * | 3/2003 | Olson .......................... 549/41 |

FOREIGN PATENT DOCUMENTS

| DE | A 2815031 | 10/1979 |
| IT | 1061813 | 4/1983 |
| JP | 10308278 | 11/1998 |
| JP | 10312885 | 11/1998 |
| WO | WO 90/01526 | 2/1990 |

OTHER PUBLICATIONS

Moore, J.A. (ed.), *Macromolecular Syntheses*, 1977, vol. 1, pp. 17–21.
Carlini et al., Dyes and Pigments, *New Daylight Fluorescent Pigments*, 1982, vol. 3, pp. 59–69.

* cited by examiner

*Primary Examiner*—Ieszek B. Killiman
(74) *Attorney, Agent, or Firm*—Carolyn A. Fischer

(57) ABSTRACT

Described are articles, laminates, sheets, coatings, retroreflective articles, pigments containing thioxanthone compounds that are fluorescent colorants.

59 Claims, No Drawings

ARTICLES CONTAINING THIOXANTHONE DYES

FIELD OF THE INVENTION

The invention relates to articles comprising thioxanthone compounds having utility as fluorescent dyes.

BACKGROUND OF THE INVENTION

Benzothioxanthone compounds are known for imparting color to certain plastic materials such as polymethylmethacrylates, polycarbonate, polystyrene, and polyester. The compounds are described, for example, in FR 2,124,384, DE-A 2,613,493, DE-A 2,815,031, IT 1,061,813 and in *Dyes and Pigments* Vol. 3, (1982) pp. 59–69. Their preparation is described in DE-B 2,134,517 and DE-B 2,134,518.

In particular, 14H-anthra[2,1,9-mna]thioxanthene-14-one compounds are described by Carlini et al. in *Dyes and Pigments* Vol. 3 (1982), pp. 59–69. One known photostable fluorescent colorant described by Carlini is 6-methoxy-14H-anthra[2,1,9-mna]thioxanthene-14-one. However, this colorant has the disadvantage of being poorly soluble in many of the polymers used to make coatings and films for traffic sheeting.

SUMMARY OF THE INVENTION

The present invention provides articles containing 14H-anthra[2,1,9-mna]thioxanthene-14-one compounds that are fluorescent colorants.

Accordingly, the present invention includes an article comprising a polymer matrix and a compound of the formula

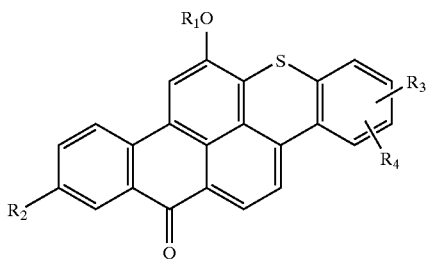

I wherein $R_1$ is a straight chain alkyl group having from 5 to 22 carbon atoms or a branched alkyl group having from 3 to 22 carbon atoms; $R_2$, $R_3$ and $R_4$ are each, independently, hydrogen or alkyl having from 1 to 4 carbon atoms.

The molecular weight (Mn) of the polymeric matrix is preferably greater than about 3000 g/mole.

The dye incorporated within the polymer matrix may be in any form such as a sheet.

A second aspect of the present invention includes a laminate containing a sheet comprising the polymer matrix and the compound of formula I. The sheet is disposed on a substrate to form a laminate.

A third aspect of the present invention provides a pigment particle comprising a polymer matrix comprising at least one of a polycarbonate and a polyester and the compound of formula I.

A fourth aspect provides an article comprising (a) a binder having a first major viewing surface; and (b) a pigment particle comprising the compound of formula I wherein $R_1$ is a straight chain alkyl group or a branched alkyl group having from 1 to 22 carbon atoms and $R_2$, $R_3$ and $R_4$ are each, independently, hydrogen or alkyl having from 1 to 4 carbon atoms; and wherein at least some of the pigment particles are disposed on or in the binder so as to be visible on the first major viewing surface of the binder.

A fifth aspect of the present invention provides a coating composition comprising the compound of formula I wherein $R_1$ is a straight chain alkyl group or a branched alkyl group having from 1 to 22 carbon atoms and $R_2$, $R_3$ and $R_4$ are each, independently, hydrogen or alkyl having from 1 to 4 carbon atoms; a film-forming resin, and a solvent.

Finally, the present invention provides non-retroreflective and retroreflective articles that include a color layer wherein the color layer comprises the above-described sheet, pigment particle and/or coating.

DETAILED DESCRIPTION OF THE INVENTION

Definitions

As referred to herein, the term "colorant" shall mean pigment and/or dyes or other substances used to impart hue and chroma and value to an article.

As referred to herein, the term "conventional colorant" or "ordinary colorant" are used interchangeably and shall mean colorants which do not exhibit fluorescent properties.

As referred to herein, the term "dye" shall mean substances which impart color to a substrate by selective absorption of light. Dyes are soluble and/or go through an application process which, at least temporarily, destroy any crystal structure of the color substances. Dyes are retained in the substrate by absorption, solution, and mechanical retention, or by ionic or covalent chemical bonds.

As referred to herein, the term "fluorescent dye" shall mean a dye which absorbs light at a first wavelength and emits light at a second wavelength which is longer than the first wavelength.

As used herein, the term "fluorescent pigment" refers to a particle which includes one or more fluorescent dyes in a polymer matrix of a polycarbonate, a polyester or a mixture thereof. The particle may be of any size and shape depending on the desired use.

As used herein, the word "fracturing" refers to breaking up a sheet of a polymer matrix and a fluorescent dye incorporated therein into particles by grinding or milling, by way of example.

As used herein, the term "equivalent diameter" shall mean the size that passes a rectangular opening in a screen of that dimension.

The luminance factor (CIE tristimulus value Y) is a standard measure of the amount of light (electromagnetic radiant power that is visually detectable by the normal human observer) radiating from a surface weighted by the eye's efficiency to convert the light to luminous sensation. It is defined as the ratio of the total luminance of a specimen to that of a perfect diffuse reflector illuminated and viewed under the same conditions. For a fluorescent material, the luminance factor is the sum of two quantities, the reflected luminance factor ($Y_R$) and the fluorescence luminance factor ($Y_F$). The fluorescence luminance factor ($Y_F$) is the ratio of the fluorescence luminance (luminance due to emitted light) of the specimen to the luminance reflected by a perfect diffuser similarly illuminated and viewed. Under any specified conditions of illumination and viewing $Y=Y_R+Y_F$. It is the existence of fluorescence luminance ($Y_F>0$) which differentiates fluorescent color specimens from their non-fluorescent counterparts and other non-fluorescent high luminance colored materials. The fluorescence luminance factor ($Y_F$) measured under specified illumination and viewing conditions is a measure of a material's efficiency to convert absorbed electromagnetic radiant power into luminous sensation. The daytime chromaticity (x,y), total luminance factor ($Y_T$), and fluorescence luminance factor ($Y_F$) calculated for the CIE D65 and the CIE 1931 observer can be measured using a Labsphere BFC-450 Bispectral Colorimeter commercially available from Labsphere, North Sutton, N.H.

The present invention provides the use of benzothioxanthone compounds of formula I

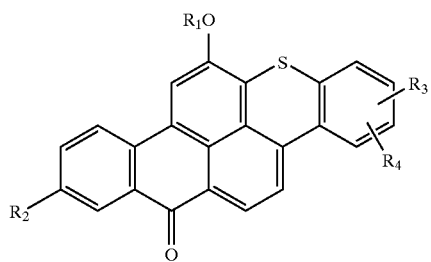

I wherein $R_1$ is a straight or branched chain alkyl group having from 1 to 22 carbon atoms; $R_2$, $R_3$ and $R_4$ are each, independently, hydrogen or alkyl having from 1 to 4 carbon atoms. The above compounds of the present invention are photostable fluorescent dyes having a fluorescence luminance, $Y_F$, greater than 3. The luminance factor, $Y_F$, of the dyes and/or articles of the invention comprising the dye is preferably at least about 8 and more preferably at least about 12. The preferred dye compounds have improved solubility characteristics and are, for example, soluble in polymer matrices to provide articles, films, coatings and the like. The compounds are also useful in pigment compositions to provide articles that include such compositions in particle form.

The compounds of formula I are predominantly red in color when used alone in the absence of other colorants. Particularly useful compounds described above include those where $R_2$, $R_3$ and $R_4$ of formula I are hydrogen. Preferred compounds are those of formula I where $R_2$, $R_3$ and $R_4$ are hydrogen and $R_1$ is a straight chain alkyl group having 5 to 12 and more preferably 6 to 12 carbon atoms or a branched alkyl group having 3 to 12 and more preferably 6 to 12 carbon atoms. Most preferred compounds are those of formula I where $R_2$, $R_3$ and $R_4$ are hydrogen and $R_1$ straight or branched chain $C_8$ or $C_9$ alkyl group. Particularly valuable dyes are 6-n-octyloxy-14H-anthra[2,1,9-mna]thioxanthene-14-one, 6-((2-ethylhexyl)oxy)-14H-anthra[2,1,9-mna]thioxanthene-14-one and 6-(1-isobutyl-3-methylbutoxy)-14H-anthra[2,1,9-mna]thioxanthene-14-one.

The compounds of formula I may be prepared by known methods. By way of illustration, the following schematic diagram shows a method of making the compounds of the present invention.

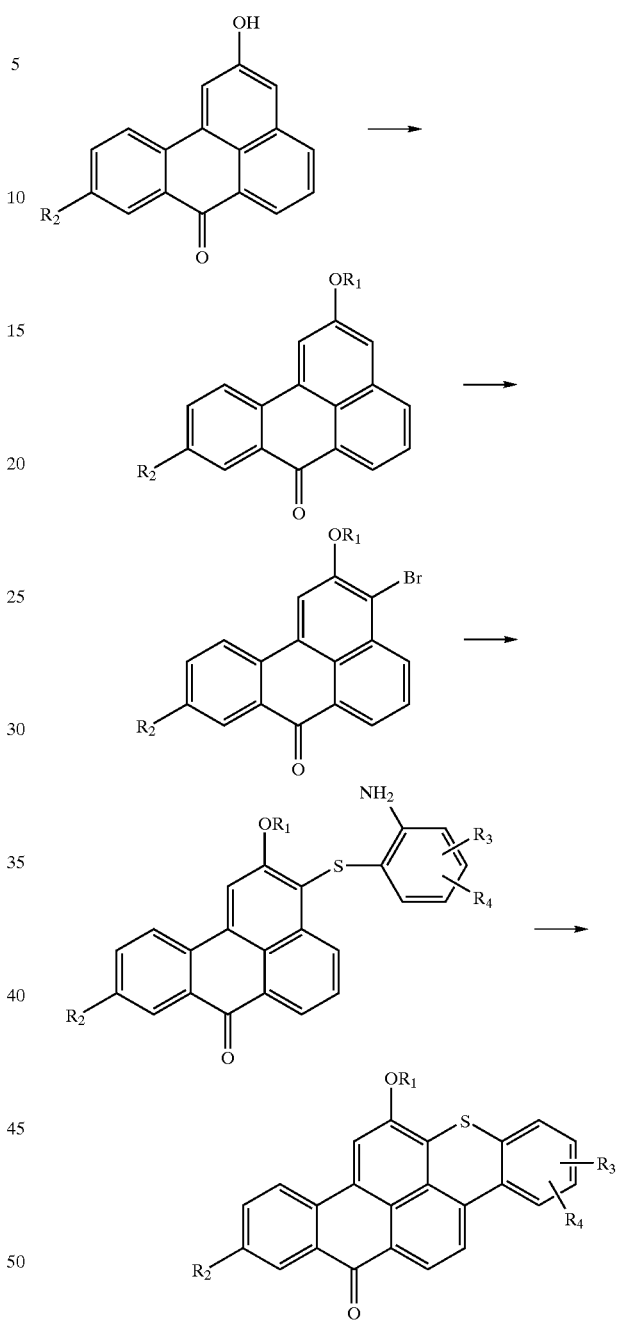

Schematic A

Generally, a 2-hydroxybenzanthrone may be alkylated with an alkyl halide in the presence of sodium or potassium carbonate in a polar-aprotic solvent to provide the desired 2-alkoxy compound. Bromination of the alkoxy compound with n-bromo succinimide (NBS) in the presence of glacial acetic acid provides the neighboring 3-bromo substituent which is then reacted with ortho-amino thiophenol at reflux in a polar-aprotic solvent such as, for example, dimethylformamide (DMF). The product is then ring-closed by treatment with hydrochloric acid, followed by reaction with sodium nitrite and then addition of a copper sulfate catalyst. Representative examples of this synthesis are also provided in the Example section.

The above-described synthesis of the compounds of the present invention employs 2-hydroxybenzanthrones as starting materials. These starting materials can be made as described in U.S. Pat. No. 4,036,859, which patent is incorporated herein by reference.

The compounds of the present invention as fluorescent dyes may be used in several ways for producing a variety of articles, laminates, pigments, articles containing pigment particles dispersed with a binder, and coating compositions for various non-retroreflective and retroreflective films, sheetings, and articles. A particular use of these dyes is in traffic signage.

The compounds of formula I are preferably employed alone or in combination with other colorants such that visible activated fluorescence is provided to the article as opposed to ultraviolet (UV) activated fluorescence. The term "visible activated" as used in this invention refers to sunlight or other light having a spectrum containing substantially all of the visible wavelengths of sunlight. Thus, the preferred dyes of this invention are brilliantly fluorescent and also bright in color in daylight.

Compounds of formula I may thus be admixed by blending or extruding the dye with a polymer matrix. The polymer matrix serves as the host for the dye and other optional adjuvants, as desired. The solubility of the compounds in the polymer matrix provides the advantage of compatibility with the polymeric matrix, in addition to photostablity and effective color. The amount of the formula of compound I, also referred to hereinafter as "dye", may vary from about 0.01 wt-% to about 10 wt-% of the polymer matrix and preferably ranges from about 0.1 wt-% to about 2 wt-% of the polymer matrix.

The polymer matrix preferably comprises a polymer or copolymer that can be formed into a sheet. The selection of polymer for the polymer matrix for a particular use will depend on variables such as the effect of the polymer on the color properties of the extruded sheet, ease of processing into sheets as well as physical properties of the sheet such as flexibility, impact resistance, elongation and the like. In general however, the polymer matrix comprises a polymer or polymer blend having a number average molecular weight of at least 3000 g/mole. Preferably, Mn is greater than about 6,000 g/mole and more preferably greater than about 10,000 g/mole. In the case of the preferred fluorescent articles, the polymer does not adversely affect the chromaticity and luminance of the sheet. These properties can be readily measured by methods described herein or by methods described in compilations of methods such as those published by the American Society of Testing Materials (ASTM) and the American National Standards Institute (ANSI).

In general, the polymer matrix is preferably substantially optically clear. Notably, such polymers retain their transparency and their shape under adverse conditions. In sum, a suitable polymer matrix is often selected for one or more of the following reasons: thermal stability, dimensional stability, environmental stability, clarity, excellent release from tooling or a mold, and capability of receiving a reflective coating.

Suitable polymers for use as the polymer matrix include polyester, unsaturated polyester, polycarbonate, polyolefin, polyvinyl chloride, polyurethane, polyacrylate or polymethylmethacrylate polymers and copolymers. The polymer can be a thermoplastic or thermoset resin. The polymer can be in the form of a powder, pellet or bead into which the dye can be easily and substantially uniformly dispersed.

Suitable polymethylmethacrylate polymers include impact modified grade polymers commercially available from ICI Acrylics, Cordova, Tenn., under the trade designation "CP 923", medium grade impact modified polymethylmethacrylate commercially available from Atofina Chemicals, Philadelphia, Pa. under the trade designations "PLEXIGLAS MI-7" and "PLEXIGLAS V825". Suitable polycarbonate resins include bisphenol A polycarbonates commercially available from Bayer Corp., Pittsburgh Pa. under the trade designation "FCR-2407", commercially available from General Electric Company, Schenectady, N.Y. under the trade designation "LEXAN 123R" and commercially available from Dow Chemical Co., Midland, Mich. under the trade designation "CALIBRE 300EP". Suitable polyester resins include polyethylene terephthalate polymer and copolymers commercially available from Eastman Chemical Co., Kingsport, Tenn. under the trade designation "SPECTAR 14471". Suitable polyolefin polymers include resins commercially available from DuPont Co., Wilmington, Del. under the trade designation "BYNEL 3100".

The composition comprising the polymer matrix and the compounds of formula I, of the present invention, may be in any form and is preferably in the form of sheets or the form of particles. The sheets can be made from the polymer and dye mixture by compression molding, casting, calendaring, extruding and the like. The thickness of the sheets may vary from about 10 to about 1,000 microns (about 0.01 to about 1 millimeter). The sheet may be substantially flat on both sides or have cube-corner retroreflective elements embossed on one side.

The fluorescent article in the form of a sheet may be laminated to a substrate, for example, a retroreflective substrate. The laminate may be formed by thermally fusing the sheet to the substrate or by interposing an adhesive layer between the sheet and the substrate. The adhesive is chosen such that it does not substantially impair the color or luminance of the laminate. A suitable adhesive is a transparent acrylic adhesive.

Alternatively or in addition thereto, the composition comprising the polymer matrix and the compounds of formula I may be in the form of pigment particles. In the absence of being combined with material that absorbs the fluorescence of the compounds of formula I, the pigment is a fluorescent pigment. The pigment may be either (1) non-retroreflective, or (2) structured so as to be retroreflective.

The pigment includes particles of a variety of shapes, including spherical, platelets such as may result from fracturing thin films and sheets, flakes, fibrous, and odd shapes. Since shape may vary so widely, a useful measure of pigment size is to measure in terms of equivalent diameter, or the size that passes a rectangular opening in a screen of that dimension. The equivalent diameter of the fluorescent pigment may also vary over a wide range depending on the desired effect. A preferred range of equivalent diameter is from about 10 to about 5,000 $\mu$m (about 0.01 to about 5 milimeters).

The polymeric materials selected for the polymer matrix of the pigment are preferably relatively inflexible, hard, and rigid materials relative to other polymers. Thus, these polymers may be fractured at room temperature or lower temperatures. Polycarbonate, polyester, and blends thereof are preferred polymer matrixes. A polycarbonate/polyester blend commercially available from Eastman Chemical Company, Kingsport, Tenn. under the trade designation "DA003", is an example of a suitable polymer matrix.

Typically, fluorescent dye concentrations are between about 0.01 and about 2 weight percent of the pigment particle, preferably between about 0.05 and about 0.7 weight percent, and most preferably between about 0.1 and about 0.5 weight percent. Other concentration ranges of dyes may be used depending on the thickness of the article. The above ranges are based on fluorescent pigment particles containing the dyes that have equivalent diameters between about 0.01 mm and about 5 mm. Articles having high concentrations of dyes tend to exhibit brighter fluorescence than articles having low concentrations of dyes. However articles having a high dye concentration may exhibit a self-quenching phenomenon which occurs when molecules of the fluorescent dye absorbs the energy emitted by neighboring fluorescent dye molecules. This self-quenching phenomenon causes an undesirable decrease in fluorescent brightness.

When it is desired that the pigment particle be retroreflective, the pigment may include retroreflective elements including microspheres and microstructured elements. Retroreflective pigment particles result from fracturing retroreflective sheets. The pigment may also be made from waste or rejected production scrap resulting from the manufacture of fluorescent prismatic retroreflective sheeting. Although fractured prismatic type sheeting is preferred for pigment including retroreflective elements, retroreflective sheeting comprising microspheres may also be used. The equivalent diameters of fluorescent pigment that is also retroreflective because of using microspheres as the retroreflective elements are considerably smaller. For example, glass microspheres may have diameters of about 0.06 mm. Since each retroreflective fluorescent pigment comprises at least one retroreflective element, the equivalent diameter of the pigment may be of the order of 0.06 mm or more.

The pigment particles of the invention may be mixed with other particles, usually prior to addition to a binder or a sheet. Alternately each type of particle and/or the pigment may be placed at selected positions in the binder or the sheet. Examples of other particles are anti-skid particles, such as disclosed in U.S. Pat. No. 5,125,178 (Haenggi); ceramic beads such as disclosed in U.S. Pat. No. 4,772,551 (Wood); glass beads such as disclosed in U.S. Pat. No. 5,716,706 (Morris); retroreflective elements such as disclosed in U.S. Pat. No. 5,774,265 (Mathers); and colored particles such as disclosed in U.S. Pat. No. 5,269,840 (Morris).

Alternatively, or in addition thereof, articles of the invention may comprise the pigment described above dispersed within a suitable binder. The binder may be the same composition as the previously described polymeric matrix. However, preferably the binder is a different polymeric composition than that of the polymer matrix. The binder containing pigment particle can then be formed into sheeting or be disposed onto sheeting as a color layer. The binders may be thermoplastic or thermosetting, may be adhesives, and may be a liquid that is later cured, such as for paints.

A particularly preferred polymeric binder is polyurethane. Those skilled in the art will recognize that the term "polyurethane" typically includes polymers having urethane and/or urea linkages, and such is the intended meaning herein. Suitable urethane polymers or copolymers for use in this layer include polyether polyurethanes, polyester polyurethanes, polycarbonate polyurethanes and blends thereof. Suitable urethanes include aliphatic or aromatic urethanes or blends thereof. Typically, many suitable thermoplastic polyurethanes include three main components: an aliphatic and/or aromatic diisocyanate; a chain extender (such as an ethylene-, propylene- or butane- diol); and a soft segment polyol (such as polyether or polyester, e.g., polyethyleneoxide, polyadipate, or polycaprolactone). Suitable urethane polymers include thermoplastic polyurethane polymers commercially available from Morton International, Chicago, Ill., under the trade designation "MORTHANE", and others including aliphatic and aromatic polyurethane, such as disclosed in U.S. Pat. No. 5,117,304 (Huang).

In addition to polyurethanes, binders and sheets onto which a color layer may be disposed, may comprises plasticized polyvinyl chloride (PVC) and preferably substantially solventless plasticized PVC, as described in published in WO 99/20688 (White). Fluorescent articles comprising PVC binders or sheets and fluorescent pigment have many desirable features, such as economy and flexibility.

Other suitable polymers for binders and/or sheets include:

copolymers of ethylene with vinyl acetate (EVA), e.g. those commercially available from DuPont, Wilmington, Del., under the trade designation "ELVAX"; from Equistar Chemicals, Houston, Tex. under the trade designation "ULTRATHENE"; and from AT Plastics, Brampton, ON, Canada, under the trade designation "ATEVA";

acid- or anhydride-modified EVAs, e.g. those commercially available from DuPont under the trade designation "ELVAX"; from Equistar Chemicals under the trade designation "ULTRATHENE"; and from DuPont under the designation "BYNEL" series 1100, 3000, 3800 and 3900 resins;

other modified EVAs, such as acid or anhydride-/acrylate- modified EVAs commercially available from DuPont under the trade designation "BYNEL", series 3100 resins;

ethylene ethyl acrylate copolymers (EEA), e.g. those commercially available from DuPont under the trade designation "ALATHON"; from Union Carbide Corporation, Danbury, Conn., under the trade designation "UNION CARBIDE DPD";

ethylene methyl acrylate copolymers (EMA), e.g. those commercially available from Chevron Phillips Chemical Company, Houston, Tex. under the trade designations "EMAC" and "EMAC+";

acid- or anhydride-modified ethylene acrylate materials (AEA), e.g., those commercially available from DuPont under the trade designation "BYNEL" series 2000 and 2100 resins;

ethylene vinyl acetate, carbon monoxide terpolymers (EVACO), e.g., commercially available from DuPont under the trade designation "ELVALOY";

ethylene n-butyl acrylate, carbon monoxide terpolymers (EBACO grade HP662 resins), e.g. commercially available from DuPont under the trade designation "ELVALOY"; and ethylene n-butyl acrylate copolymers (EnBA).

Binders holding the pigment in a suitable position are selected to form a satisfactory article. The binder may have the pigment randomly dispersed throughout, or the pigment may be orientated, or the pigment may be only on the viewing surface of the binder, or various combinations thereof. The pigment is preferably on the major viewing surface of the article. Disposal of pigment onto only a portion of the viewing surface of a binder or of a sheet results in more efficient use of the expensive dye. Another alternate preferred location for the pigment is on a colored backing.

The amount of fluorescent pigment is sufficient to attain the desired fluorescent appearance for the article. The amount of fluorescent pigment is preferably a minimum to achieve both economy and fluorescence for the article. The amount of fluorescent pigment is dependent on the equivalent diameter of the pigment. For example, for pigment having an equivalent diameter of approximately 3,000 μm (3 millimeters), an application rate of approximately 50 grams per square meter on a binder or on a sheet is sufficient to make a fluorescent article. Other suitable application rates may be determined by one of ordinary skill in the art. The application rate of fluorescent pigment may also be adjusted to achieve total coverage of the surface of the binder or sheet, as desired.

The fluorescent pigment in combination with a binder, preferably a thermoplastic, may be adhered to a pavement marking surface or suitable substrate to form fluorescent pavement marking articles. The combination of the durable pigment with a suitable binder results in durable articles having conformability and/or other selected desirable features. Suitable substrates for pavement markers are known to be typically either concrete or asphalt. Flame sprayed thermoplastic pavement marking systems have relatively low cost, and are especially quick and easy to apply, even on roughened or cracked surfaces or under extremely low temperatures.

U.S. Pat. No. 3,279,336 (Eden); U.S. Pat. No. 3,393,615 (Micheln); U.S. Pat. No. 3,410,185 (Harrington); U.S. Pat. No. 3,664,242 (Harrington); U.S. Pat. No. 3,849,351 (Jorgansen); U.S. Pat. No. 3,874,801 (White); U.S. Pat. No. 3,914,468 (Condon); U.S. Pat. No. 4,058,641 (Hnojewyj); and U.S. Ser. No. 09/132,270 (Purgett); and the brochures entitled "Green Lite™ Striping powder and GLG-30 System" (publication 75-0299-9287-4(52.25) R1) and "Green Lite™ Striping Powder" (publication 75-0299-7789-1 (120.5) ii) describe machines and compositions for use in flame spray pavement marking applications. Preferably such devices employ an air-propane combustion system, and provide reliable control of process variables, such as machine speed, material flow rates, pavement marking surface preheat temperature, flame size and shape, and material residence time in the flame. For example, by using fluidized powder feed mechanisms such as those employed in delivery systems commercially available from Eutectic Corporation, Charlotte, N.C. under the trade designation "TECFLO Model 5102" or "TECFLO 3500 Model E", the delivery rate of the fluorescent pavement marking powder can be reliably controlled. Flame sprayable materials typically have melt indices above about 80, more preferably above about 200, and most preferably above about 500. The melt index of a material may be determined according to Condition 190/2.16 and the procedure given in ASTM D1238-95.

Fluorescent pigment may be added to liquid binders, sprayed onto a road surface, and cured to form liquid pavement marking articles. Preferred liquid binders are either water-borne or solvent-free, such as those disclosed in U.S. Pat. No. 5,714,527 (Jilek); U.S. Pat. No. 5,747,626 (Krepski); U.S. Pat. No. 5,756,633 (Larson); and U.S. Pat. No. 6,166,106 (Purgett).

The fluorescent pigment in combination with a binder or sheet may be placed on a helmet or other articles to provide increased visibility and durability in such transportation safety applications as described in U.S. Pat. No. 4,100,625 (Tung).

Fluorescent pigment may be made by grinding sheets of binder materials containing dye to form particles. Such binder materials are described in U.S. Pat. No. 5,605,761 (Burns); and U.S. Pat. No. 5,674,622 (Burns). The fluorescent pigment may also be made by grinding fluorescent pellets used for making fluorescent articles, or fluorescent film or fluorescent cube layers, for example as described in U.S. Pat. No. 5,605,761 (Burns); and U.S. Pat. No. 5,674,622 (Burns). Alternatively the fluorescent pellets may be used as the fluorescent pigment. Retroreflective sheeting, of various types, for example as described in the above Burns patents, may also be ground to equivalent diameters suitable for making fluorescent articles. Suitable grinding methods, also more generally known as comminution, are disclosed in "Mining and Treatment of Raw Materials", by Norton, *Elements of Ceramics*, Chapt. 6, 57–62, (1974). This reference also discloses Tyler Series Screens, their openings in mm, and size classification of particles using such screens. Equivalent diameter of the fluorescent pigment corresponds to the size of the opening in the screen at which 100 weight percent of the particles pass through the opening.

Alternatively, or in addition thereto in any combination, the compounds of formula I may also be employed in a coating composition. Preferably, the coating composition is obtained by combining the compound of formula I, a film-forming resin and a solvent in which both the compound and the resin are soluble. The composition is applied as a coating to a substrate by any suitable method such as a wire wound draw down bar, silk screen, spray, gravure, doctor blade, roll coater and the like at a (dry) coating thickness ranging from about 1 micron to about 250 microns.

The coating may be applied to uniformly cover the substrate or as indicia on the substrate to communicate information. In one embodiment, the substrate is retroreflective sheeting having a white or silvery white color. Although other colored substrates are permitted by the invention, a white substrate tends to maximize the luminance of the coated object. The coating may additionally contain a light transmissive pigment as long as the pigment does not cause the color and luminance properties of the coating to shift outside the specified range. Representative pigments are found in U.S. Pat. No. 5,272,562, incorporated herein by reference.

The compounds of formula I are preferably co-soluble with a film forming resin and provides a coating having a fluorescence luminance factor of greater than 3. The dye content with respect to the resin content of the invention is not less than about 0.01 wt-% of the film-forming resin. The amount of dye for a particular use is readily determined by its ability to form a solution with the film forming resin and by luminance of the coatings made therefrom. Suitable film forming resins include those which form a solution with a compound of formula I and do not adversely affect the luminance of coatings made therefrom. The composition of the invention preferably contains about 20 to about 80 parts of resin, more preferably about 30 to about 70 parts resin and most preferably about 35 to about 65 parts resin.

The film forming resin may be the same polymer as the previously described polymeric matrix. Typically, however, the film forming resin is different than the polymeric matrix with regard to composition, molecular weight (Mn), molecular weight distribution, etc., such that a stable solution can be formed that result in a uniform film layer after application and evaporation of the solvent. The film forming resin component of the coating of the present invention may be an acrylic resin, a polyester resin, a vinyl resin, a polyacrylate polymer or copolymer (e.g. polymethylmethacrylate) or mixtures thereof. The film forming resin provides a matrix to bind the fluorescent red dye to the substrate. Polyester resins include copolyester resin commercially available from Bostik Inc., Middleton, Mass. under the trade designation "Vitel 2300BG". Vinyl resins include vinyl chloride/vinyl acetate/vinyl alcohol terpolymer resins commercially available from Union Carbide Corp., Danbury, Conn. under the trade designation "UCAR VAGH". A suitable film forming acrylate resin methylmethacrylate/ butylmethacrylate copolymer commercially available from Rohm and Haas, Corp., Philadelphia, Pa. under the trade designation "Paraloid B66".

The coating composition also includes a solvent. The solvent may be a single solvent or a blend of solvents. Suitable solvents are those which dissolve the dye and the resin and provide a coating with the defined luminance parameters. Solvents include dipropyleneglycol monomethylether acetate commercially available from Dow Chemical, Co., Midland, Mich. under the trade designation "Dowanol DPMA", methylisobutyl ketone (MIBK), methylethylketone (MEK), diisobutyl ketone (DIBK), acetone, toluene and mixtures thereof. For embodiments wherein the film-forming resin forms a stable aqueous solution, emulsion, or dispersion, the solvent of the coating composition may be water.

The coating composition may contain optional additives to provide desirable properties to the flow characteristics of the invention. For example, a silicone material commercially available from General Electric Co., Schenectady, N.Y. under the trade designation "SF 96 Silicone", or a nonionic fluorosurfactant commercially available from 3M under the trade designation "FC 431" (a 20 wt. % solution of fluorosurfactant in Dowanol DPMA solvent), may be added to the invention as flow agents. Typically, the amount of additives in the invention does not exceed 5 parts of the total composition after evaporation of the solvent.

Fluorescent compositions for forming coatings may be made by stirring the dye into a solution of Paraloid B66 resin in Dowanol DPMA to form a solution of the resin and dye. If other additives such as flow agents or UV light absorbing agents are used, they may be conveniently added before addition of the dye.

The coating composition may be applied directly to the retroreflective substrate, or it may be applied, for example, to a clear carrier sheet which is then laminated to the substrate. The carrier sheet or film may be a polyurethane, polyvinyl chloride, a polyester, an unsaturated polyester or acrylic polymer or copolymer film, typically having a thickness of about 50 microns to 75 microns, and may be supported, for example, by a backing film. The carrier sheet or film may be thermoplastic or thermoset resin and the backing film may be a polyethylene coated paper or a polyester film. The composition may be applied substantially uniformly across the entire surface of the carrier sheet or in the form of indicia. Solvent may be evaporated from the coating by conventional means to provide a coating substantially free of solvent. The carrier sheet having a fluorescent coating may then be laminated to an adhesive coated reflective or retroreflective sheet or to an adhesive coated release liner having a reflective or retroreflective surface. The liner may be paper, polyester or polyolefin and coated with a silicone release agent on the side of the liner in contact with the adhesive. The release liner protects the adhesive layer and facilitates handling of the carrier sheet prior to use. The release liner can be stripped from the coated carrier sheet leaving the adhesive on the carrier sheet. The carrier sheet can then be adhered to a rigid material such as aluminum sheeting suitable for signage.

The carrier sheet having a fluorescent coating may be applied, for example, to a polycarbonate film having cube corner retroreflective elements on one surface. If the carrier sheet has a backing film, the film may be removed and the coated surface of the carrier sheet hot laminated to the surface of the polycarbonate film opposite the surface having the cube corner structure. Alternatively, the backing sheet may be removed after the laminate has been formed. The carrier sheet/polycarbonate laminate may be affixed to a rigid substrate with an adhesive to provide a fluorescent article such as a stop sign. A retroreflective layer may be applied to the fluorescent coating side of the carrier sheet before laminating the carrier sheet to the substrate, or the retroreflective layer may be applied to the rigid substrate and the fluorescent side of the carrier sheet laminated to the retroreflective layer of the substrate. The carrier sheet also may provide an overlay film to protect the coated reflective substrate from the weather when used in an outdoor environment.

Regardless of whether the compound of formula I is combined with a polymer matrix in the form of a sheet or pigment particle, the pigment particle is further dispersed within a binder, or the compound of formula I is combined with a film forming resin and solvent to form a coating composition, each of these compositions may further comprise other adjuvants. Such additional adjuvants include one or more colorants, light stabilizers, UV absorbers, antioxidants, and other additives to improve the durability of the dye in the polymer matrix or processing aids such as antiblocking agents, releasing agents, lubricants, etc.

The fluorescent dye of formula I may be used alone or in combination with one or more additional colorants. Colorants that may be added to the compounds of formula I include other fluorescent dyes including other thioxanthone dyes, such as C.I. Solvent Yellow 98, thioindigoid dyes, such as C.I. Vat Red 41, a naphthalamide dye, such as C.I. Solvent Yellow 43, a benzoxazole coumarin dye, such as C.I. Solvent Yellow 160: 1, a perylene imide dye, such as commercially available from BASF Aktiengesellschaft, Ludwigshafen, Germany under the trade designation "Lumogen F Orange 240", a perylene dye, such as C.I. Solvent Green 5, or an isovaleranthrone dye, such as C.I. Pigment Violet 31.

In other instances, coloring agents such as pigments or other dyes in addition to those described above may be employed to adjust the color and appearance of the article. If desired, non-fluorescent dyes or pigments may also be used; however, such dyes are selected so as to not undesirably interfere with the fluorescent performance of the daylight fluorescent dyes discussed above or with the overall appearance of the article. In the case of retroreflective articles, any non-fluorescent dyes or pigments used should not undesirably impair the transparency of the color layer. Pigments and other dyes that may be useful as additions are those contained in U.S. Pat. No. 5,272,562 and U.S. Pat. No. 5,674,622, which are incorporated herein by reference.

Light stabilizers that may be used include hindered amines. Illustrative examples of hindered amine light stabilizers (HALS) include those commercially available from the Ciba-Geigy Corporation, Hawthorne, N.Y. under the trade designations "TINUVIN-144, -292, -622, -770," and "CHIMASSORB-944." Other commercially available representative light stabilizing compounds include benzophenones and triazines from Cytec Industries under the respective trade designations "Cyasorb UV531" and "Cyasorb UV1164". Light stabilizing compounds, and preferably HALS are added at about 0.1 to about 2 weight percent, although larger amounts may also be added if desired.

The invention may also contain UV light absorbing compounds to improve the light stability of the sheets, color layers and coatings made therefrom, especially from exposure to sunlight. Illustrative examples of UV absorbers include derivatives of benzotriazole, such as those commercially available from Ciba-Geigy Corp. under the trade designations "TINUVIN-327, -328, -900, -1130, " and "TINUVIN-P"; chemical derivatives of benzophenone, such as commercially available from BASF Corp. under the trade designations "UVINUL-M40, -408, -D-50"; chemical derivatives of diphenylacrylate, such as those commercially available from BASF Corporation under the trade designations "UVINUL-N35, -539." UV absorbers are preferably added at about 0.4 to 4 weight percent of the composition comprising the dye, although again different amounts may also be used if desired.

Free radical scavengers or antioxidants may be used. Illustrative examples of suitable antioxidants include hindered phenolic resins, such as those commercially available from the Ciba-Geigy Corp. under the trade designations "IRGANOX-1010, -1076,-1035," and "MD-1024," and "IRGAFOS-168." These adjuvants are added in amounts suitable to decrease oxidation, such as for example about 0.01 to 0.5% by weight of the composition comprising the dye.

Small amounts of processing aids may be added to improve the matrix polymer's processability, such as in extrusion equipment. Useful processing aids include: (1) fatty acid esters, or fatty acid amides; (2) metallic stearates; or (3) waxes, oils, and release agents for aid in extrusion processes. Anti-sticking powders, such as talc, fumed silica, clay, and calcium carbonate, may also be used to aid in extrusion processes. Such adjuvants are added in amounts that do not significantly reduce transparency of the matrix polymer and yet provide the desired function. Such adjuvants are typically no more than about one percent by weight of the fluorescent pigment, but may be more or less as noted to serve functionally.

Articles, comprising the compounds of formula I incorporated into a polymer matrix in the form of a sheet or pigment particle; articles comprising a sheet or color layer comprising the pigment dispersed within the binder as well as articles comprising the coating composition have numerous embodiments. Some of these embodiments include fluorescent sheeting comprising the polymer matrix and compounds of formula I and/or the pigment particle dispersed in the binder; retroreflective fluorescent sheeting comprising the polymer matrix and compounds of formula I and/or the pigment particle dispersed in the binder; fluorescent color layers comprising the polymer matrix and compounds of formula I and/or the pigment particle dispersed in the binder and/or the coating composition; and non-fluorescent sheeting (e.g. layer comprising dye is buried within construction or other material absorbs the fluorescence). Other combinations and variations are apparent to those skilled in the art based on the teachings herein.

Generally, retroreflective materials include a monolayer of optical elements typically in the form of glass microspheres (i.e., beads). These microspheres can be embedded in a polymeric binder layer or pressed into a polymeric film, for example. Alternatively, the retroreflective materials can include prismatic-type optical elements. Such materials are well known to those of skill in the art.

Retroreflective materials (also referred to as sheeting) of the present invention may be, for example, "beaded sheeting" in the form of an enclosed-lens sheeting, embedded-lens sheeting, or encapsulated-lens sheeting, as well as cube corner retroreflective sheeting. Such articles are described, for example, in U.S. Pat. Nos. 2,407,680; 4,511,210; 4,950,525; 3,190,178; 4,025,159; 4,896,943; 5,064,272; 5,066,098; 3,684,348; 4,801,193; 4,895,428; and 4,938,563.

These types of sheetings are commercially available from Minnesota Mining and Manufacturing Company ("3M"), St. Paul, Minn. under the trade designations "Scotchlite Diamond Grade LDP Retroreflective Sheeting Series 3970" and "Scotchlite Diamond Grade VIP Reflective Sheeting Series 3990", "Scotchlite Engineer Grade Reflective Sheeting" and "Scotchlite High Intensity Grade Reflective Sheeting". The types of retroreflective sheeting are described in "Standard Specification for Retroreflective Sheeting for Traffic Control", ASTM D 4956-94. Brightness or retroreflectivity of the sheeting may be expressed as the Coefficient of Retroreflection, $R_A$. This is measured in units of candelas/lux/square meter and is determined using standardized test ASTM E 810-94.

Illustrative examples of enclosed lens retroreflective sheeting are disclosed in U.S. Pat. No. 2,407,680 (Palmquist); U.S. Pat. No. 3,551,025 (Bingham); U.S. Pat. No. 3,795,435 (Schwab); U.S. Pat. No. 4,530,859 (Grunzinger, Jr.); U.S. Pat. No. 4,664,966 (Bailey); U.S. Pat. No. 4,950,525 (Bailey); U.S. Pat. No. 5,064,272 (Bailey); and U.S. Pat. No. 5,882,771 (Klein).

Illustrative examples of encapsulated lens retroreflective sheeting are disclosed in U.S. Pat. No. 3,190,178 (McKenzie); U.S. Pat. No. 4,025,159 (McGrath); U.S. Pat. No. 4,663,213 (Bailey); U.S. Pat. No. 5,069,964 (Tolliver); U.S. Pat. No. 5,714,223 (Araki); U.S. Pat. No. 5,812,316 (Ochi); and U.S. Pat. No. 5,784,198 (Nagaoka).

Illustrative examples of encapsulated prismatic-type retroreflective sheeting are disclosed in U.S. Pat. No. 5,138,488 (Szczech); U.S. Pat. No. 5,450,235 (Smith); U.S. Pat. No. 5,614,286 (Bacon); U.S. Pat. No. 5,706,132 (Nestegard); U.S. Pat. No. 5714,223 (Araki); and U.S. Pat. No. 5,754,338 (Wilson).

Illustrative examples of exposed lens retroreflective sheeting are disclosed in U.S. Pat. No. 2,326,634 (Gebhard); U.S. Pat. No. 2,354,018 (Heltzer); U.S. Pat. No. 2,354,048 (Palmquist); U.S. Pat. No. 2,354,049 (Palmquist); U.S. Pat. No. 2,379,702 (Gebhard); and U.S. Pat. No. 2,379,741 (Palmquist).

Illustrative examples of raised-ridge prismatic-type retroreflective sheeting are disclosed in U.S. Pat. No. 5,914,812 (Benson).

The retroreflective member is preferably sufficiently thick to provide the above desirable properties. The thickness of the retroreflective member preferably is between about 0.01 mm to 0.3 mm thick, and more preferably between 0.02 mm to 0.2 mm.

All of the polymers and various members of the retroreflective article may also contain various adjuvants as previously described and in particular additives to improve weathering and heat stability.

The articles of the invention may further comprise a protective layer or overlay. Such protective layers typically form an exterior side to the laminate. The overlay may be made from the same polymeric resin as the fluorescent sheet. The overlay may be transparent and may contain UV light absorbing materials to protect the laminate from the adverse effect of exposure to sunlight. The UV light absorbing substance may be incorporated into the overlay rather than into the fluorescent coating as the UV light absorbing substance may adversely affect fluorescence if dispersed in the same matrix as the fluorescent dye. The overlay also protects the laminate from deleterious effects of weather, ozone and other environmental contaminants. The overlay may be attached to the fluorescent sheet by adhesive or by co-extrusion during formation of the fluorescent sheet. Typically, the overlay is disposed on a backing film and the fluorescent coating applied to the backing film as described above. However, the overlay may be applied to the fluorescent coating after the article is formed.

Objects and advantages of the invention are further illustrated by the following examples, but the particular materials and amounts thereof recited in the examples, as well as other conditions and details, should not be construed to unduly limit the invention. All parts, percentages and ratios herein are by weight unless otherwise specified.

EXAMPLES

Example 1

6-n-Octyloxy-14H-anthra(2,1,9mna)thioxanthene-14-one

A. Preparation of Sulfate Salt of Anthraquinoyl Diazonium.

Into a three necked 0.5 liter round bottom flask, containing 150 ml of concentrated sulfuric acid and equipped with a thermometer and a mechanical stirrer, and immersed into an ice bath, 17 g (0.246 M) of finely ground sodium nitrite powder was added in portions, carefully maintaining the reaction temperature below 10° C. Upon the completion of the sodium nitrite addition, the ice bath was removed and the introduction of 50 g (0.224 M) of 1-aminoanthraquinone commenced. A slow rise in temperature was observed. Upon the completion of the 1-aminoanthraquinone addition (here the reaction mass color changed from yellow-green to reddish-brown), the reaction mixture was heated to 50° C. and held at 50° C. for 20 minutes, and then allowed to cool to room temperature.

The cooled reaction mixture was decanted after mixing in a beaker, into which 350 g of finely chopped ice had been placed. After the light green mass of the diazonium sulfate salt heated the ice to melting, it was filtered and washed with water (50 ml) and acetone (30 ml); $T_m$=158–165° C. The diazonium sulfate salt was used as such in the next step.

B. Preparation of 1-acetonylanthraquinone.

Diazonium sulfate salt from Step A (74.4 g; based on assumed theoretical yield) was placed into a three-neck flask, equipped with a mechanical stirrer and a thermometer, and to it was added 150 ml of water, 150 ml acetonitrile and 96 moles isopropenyl acetate. The mixture was heated to 35–40° C. while stirring, and copper monochloride (1.8 g) was added portion-wise as the catalyst. Evolving bubbles of gaseous nitrogen, accompanied by an increase in temperature were observed. After the addition of the final portion of the copper monochloride during which no nitrogen was evolved, the temperature of the reaction mixture was raised to 60° C. and held at that temperature for 30 minutes. At this point the intermediate product of the reaction surfaced and floated as an amorphous substance, and subsequently settled in a powder-like form. To the reaction mass, cooled to room temperature was added 100 ml of water. The precipitate was filtered and washed until the rinsing water remained at neutral pH. The product thus obtained was lightly gray in color; $T_m$=170–175° C. The 1-acetonylanthraquinone was used as such in the next step.

C. Preparation of 2-hydroxy-7H-benzo[de]anthracene-7-one.

1-Acetonylanthraquinone from Step B (59 g; based on assumed theoretical yield) was placed into a 1 liter round bottom flask, 500 ml of EtOH and 25 g KOH were added. This mixture was refluxed for one hour. As the solution heated up, it turned dark red. After the one hour reflux, the mixture was filtered and decanted into a 2 liter beaker. Water (500 ml) was added and to this, a sufficient amount of 35% HCl to render the pH value between 4 and 5. Immediately a bright red precipitate, 2-hydroxy-7H-benzo[de]anthracene-7-one, fell out of solution. It was filtered and washed with water; $T_m$=275–280° C.; yield (based on 1-aminoanthraquinone)=50 g (91%).

D. Preparation of 2-n-octyloxy-7H-benzo[de]anthracene-7-one.

2-Hydroxy-7H-benzo[de]anthracene-7-one (50 g; 0.203M), 30.8 g potassium carbonate (0.223M; heated for 3 hours at 250° C. to remove water), 55 ml of n-octyl bromide and 150 ml DMF were placed into a 0.5 liter two-necked round bottom flask equipped with a mechanical stirrer and a thermometer. The mixture was heated to 100° C. for 5 hours under stirring and then allowed to cool to room temperature. The precipitate was filtered and washed with water, ethanol (50 ml) and hexane (50 ml). The product had a light greenish color; $T_m$=94–98° C.; yield=69 g (95%).

E. Preparation of 2-n-octyloxy-3-bromo-7H-benzo[de]anthracene-7-one.

2-n-Octyloxy-7H-benzo[de]anthracene-7-one (71.6 g; 0.2 M) was placed into a 0.5 liter round bottom flask equipped with a mechanical stirrer. N-Bromosuccinimide (40.0 g; 0.24M) and 350 ml of glacial acetic acid were added. The bromination took place in a water bath at 60° C. for three hours under stirring. The reaction was cooled and filtered. The precipitate was washed with glacial acetic acid (50 ml) and then with hot water (300 ml). The yellow color product had a $T_m$=95–103° C.; yield=79.5 g (91%).

F. Preparation of 3-[(2-aminophenyl)thio]-2-n-octyloxy-7H-benzo[de]anthracene-7-one.

Into a 0.5 liter single necked round bottom flask, containing 78.7 g of 2-n-octyloxy-3-bromo-7H-benzo[de]anthracene-7-one (0.18M), was added 21 g (0.2M) of 90% ortho-aminothiophenol, 23.8 g (0.22M) sodium carbonate and 300 ml of DMF. The reaction was boiled for two hours or until thin layer chromatography using chloroform as the elutant indicated the disappearance of the bromo-derivative. The mixture was cooled and 150 ml of water was added. The mixture was stirred and the light brown precipitate was filtered. The precipitate was washed until it stopped coloring the wash waters. The yield=79.7 g (92%); $T_m$=118–124° C.

G. Preparation of 6-n-octyloxy-14H-anthra(2,1,9-mna)thioxanthene-14-one.

Into a 2 liter three-necked round bottom flask, equipped with a mechanical stirrer and a thermometer, containing 77 g 3-[(2-aminophenyl)thio]-2-n-octyloxy-7H-benzo[de]anthracene-7-one (0.16M), placed into an ice bath, was added 1100 ml of DMF. The mixture was cooled to 10° C. while stirring. 35% Hydrochloric acid (247 ml) was added portionwise, ensuring that the reaction temperature did not exceed 20° C. After the HCl addition was complete, the reaction was cooled to 0° C. and a solution of 14.0 g (0.2M) $NaNO_2$ in 78 ml of $H_2O$ was added portionwise, making sure that the reaction temperature did not rise above 5° C. The reaction mixture was held at 5° C. for an additional 1 hour after the completion of the sodium nitrite addition. Then, during the addition of 5.2 g copper sulfate catalyst, the reaction was heated, and at 15° C., nitrogen bubbles began to evolve. The reaction mass was held at 100° C. for 1.5 hours, cooled and the red colored precipitate was filtered and washed with water, then ethanol. The yield=66.89 g (90%); $T_m$=205–208° C.

Example 2

6-[(2-Ethylhexyl)oxy]-14H-anthra[2,1,9-mna]thioxanthene-14-one

A. Preparation of 2-[(2-ethylhexyl)oxy]-7H-benzo[de]anthracene-7-one.

A 500 ml three neck flask was equipped with a mechanical stirrer, heating mantle and condenser. To the flask was added 25 g 2-hydroxy-7H-benzo[de]anthracene-7-one, 18 g powdered potassium carbonate, 25 g 2-ethylhexyl bromide and 250 g dimethylformamide (DMF). The mixture was heated to reflux. After seven hours, 4.5 g 2-ethylhexyl bromide was added and the mixture heated at reflux for an additional three hours. The mixture was then cooled to room temperature and 500 g deionized water was added. The solution was extracted twice with 200 g chloroform. The organic layers were combined and washed twice with 250 g water. The solvent was removed on a rotary evaporator, then the crude product was passed through a flash silica gel column using methylene chloride as the elutant. The product fractions were collected and the solvent removed using a rotary evaporator. The yield of 2-[(2-ethylhexyl)oxy]-7H-benzo[de]anthracene-7-one was 28.5 g.

B. Preparation of 3-bromo-2-[(2-ethylhexyl)oxy]-7H-benzo[de]anthracene-7-one.

A 500 ml three neck round bottom flask was equipped with a mechanical stirrer, heating mantle and condenser. To the flask was added 28.5 g 2-[(2-ethylhexyl)oxy]-7H-benzo[de]anthracene-7-one, 15 g N-bromosuccinimide and 160 g DMF. The mixture was agitated well, heated to 50° C. and held at 50° C. for two hours. The mixture was cooled to 0° C. and, after several hours, the mixture was filtered to recover the solid product. The solid was suspended in 250 g water, stirred well and filtered. The yellow solid product was dried in a 50° C. oven for ten hours to give 27.1 g of 3-bromo-2-[(2-ethylhexyl)oxy]-7H-benzo[de]anthracene-7-one with melting point of 85–88° C.

C. Preparation of 3-[(2-aminophenyl)thio]-2-[(2-ethylhexyl)oxy]-7H-benzo[de]anthracene-7-one.

A 250 ml three neck round bottom flask was equipped with a mechanical stirrer, heating mantle and condenser. To the flask was added 27 g of 3-bromo-2-[(2-ethylhexyl)oxy]-7H-benzo[de]anthracene-7-one, 5.0 g sodium carbonate, 8.5 g 2-aminothiophenol and 80 g DMF. The mixture was agitated well, heated to 120–130° C., and held at 120–130° C. for three hours. Sodium carbonate (1.0 g) and 1.2 g 2-aminothiophenol were added and the mixture heated for an additional one hour. The reaction mixture was cooled to 25° C. and 250 g of water were added. The reaction mixture was extracted twice with 200 g chloroform. The organic layers were combined and washed twice with 250 g water. The solvent was removed on a rotary evaporator, then the crude product was passed through a flash silica gel column using methylene chloride as the elutant. The product fractions were collected and the solvent removed using a rotary evaporator. The yield of semi-solid 3-[(2-aminophenyl)thio]-2-[(2-ethylhexyl)oxy]-7H-benzo[de]anthracene-7-one was 27.5 g.

D. Preparation of 6-[(2-ethylhexyl)oxy]-14H-anthra[2,1,9-mna]thioxanthene-14-one.

A one liter three neck round bottom flask was equipped with a mechanical stirrer, additional funnel, thermometer and condenser. To the flask was added 27.5 g of 3-[(2-aminophenyl)thio]-2-[(2-ethylhexyl)oxy]-7H-benzo[de]anthracene-7-one and 400 g DMF. The reaction mixture was cooled with a dry ice bath to 0° C. and 63 g con. HCl was added, keeping the reaction temperature below 10° C. While this addition was taking place, 4.2 g sodium nitrite were dissolved in 10 g water. The reaction mixture was cooled to 0° C. and the sodium nitrite in water was added slowly, keeping the reaction temperature below 5° C. After completing the addition, the reaction was stirred for three hours while the temperature was held at 0° C. or less.

Copper (II) sulfate (0.4 g) was added to the reaction and heating of the reaction mixture was begun. As the cyclization occurred, nitrogen gas was evolved and a mild exotherm occurred. The reaction was heated to 100° C. and stirred well at 100° C. for two hours. The reaction was cooled to 25° C. and filtered. The solid which was collected was slurried with 500 g water and mixed well while heating to 60° C. The resultant mixture was filtered, then the solids dried in a 50° C. oven for ten hours to give 17 g of 6-[(2-ethylhexyl)oxy]-14H-anthra[2,1,9-mna]thioxanthene-14-one with a melting point of 175–177° C. Carbon 13 nuclear magnetic resonance (13C NMR) spectroscopy showed the product was the desired dye molecule.

Example 3

6-(1-Isobutyl-3-methylbutoxy)-14H-anthra[2,1,9-mna]thioxanthene-14-one

A. Preparation of 1-isobutyl-3-methylbutyl methanesulfonate.

In a one liter three-neck flask was mixed 100 g (0.69 moles) of 2,6-dimethyl-4-heptanol and 580 g chloroform. Triethylamine (77.1 g; 6 moles) was added and the reaction mixture cooled to 0° C. Methanesulfonyl chloride (83.4 g; 0.73 moles) was added dropwise, keeping the reaction temperature about 0° C. After holding at about 0° C. for one hour, gas chromatograph (GC) showed less than 5% residual alcohol.

The reaction was warmed to room temperature, then filtered to remove insolubles. The filtrate was washed with 500 g de-ionized water. The organic layer was separated and dried over magnesium sulfate. The magnesium sulfate was removed and the solvent evaporated on a rotary evaporator to give 170 g of yellow oil, which was used as such in the next step.

B. Preparation of 2-(1-isobutyl-3-methylbutoxy)-7H-benzo[de]anthracene-7-one.

A 500 ml three neck flask was equipped with a mechanical stirrer, heating mantle and condenser. To the flask was added 50 g (0.20 mole) 2-hydroxy-7H-benzo[de]anthracene-7-one and 740 g dry DMF. To the flask was added 8.9 g (0.22 mole) sodium hydride (60% dispersion in mineral oil). After the bubbling subsided, 45 g (0.20 mole) of 2-(1-isobutyl)-3-methylbutyl methanesulfonate were added. The mixture was heated to 90° C. and held at 90° C. for three hours. Thin layer chromatography (TLC) showed some residual starting material. The reaction was cooled to 25° C. and 6 g of the sodium hydride in mineral oil and then 25 g of 2-(1-isobutyl)-3-methylbutyl methanesulfonate were added and the mixture heated at 95° C. for three hours. The mixture was cooled to room temperature and again 6 g of the sodium hydride mixture and then 25 g of 2-(1-isobutyl)-3-methylbutyl methanesulfonate were added and the mixture again heated at 95° C. for three hours. TLC showed no residual starting 2-hydroxy-7H-benzo[de]anthracene-7-one. Most of the DMF was removed from the reaction mixture using heat and vacuum, then 300 g deionized water and 500 g chloroform were added. The layers were separated and then the aqueous layer was extracted with 200 g chloroform. The organic layers were combined and washed twice with 250 g water. The crude product was passed through a short silica gel column to remove some dark impurities. The solvent was removed using a rotary evaporator. The yield was 45 g of a dark brown oil that was used as such in the next step.

C. Preparation of 3-bromo-2-(1-isobutyl-3-methylbutoxy)-7H-benzo[de]anthracene-7-one.

A 500 ml three neck round bottom flask was equipped with a mechanical stirrer, heating mantle and condenser. To the flask was added 45 g (0.12 mole) of 2-(1-isobutyl-3-methylbutoxy)-7H-benzo[de]anthracene-7-one, 23.6 g (0.13 mole) N-bromosuccinimide and 265 g DMF. The mixture was agitated well, heated to 50° C. and held at 50° C. for two hours. Some of the DMF was stripped from the reaction using heat and vacuum and then 300 g chloroform were added to the flask. The resulting solution was washed three times with 250 g deionized water. The solvent was removed using a rotary evaporator; the yield was 52.5 g of a dark brown oil.

D. Preparation of 3-[(2-aminophenyl)thio]-2-(1-isobutyl-3-methylbutoxy)-7H-benzo[de]anthracene-7-one.

A 500 ml three neck round bottom flask was equipped with a mechanical stirrer, heating mantle and condenser. To the flask was added 52.5 g (0.11 mole) of 3-bromo-2-(1-isobutyl-3-methylbutoxy)-7H-benzo [de]anthracene-7-one (4), 9.2 g (0.087 mole) sodium carbonate, 16.0 g (0.13 mole) 2-aminothiophenol and 170 g DMF. The mixture was agitated well and heated at 120–130° C. for three hours. The reaction was cooled to 25° C. and 300 g water was added. The reaction mixture was extracted twice with 250 g chloroform. The organic layers were combined and washed twice with 250 g water. The solvent was removed on a rotary evaporator. The yield of crude product was 55 g of a dark brown oil which was used as such in the next step.

E. Preparation of 6-(1-isobutyl-3-methylbutoxy)-14H-anthra[2,1,9-mna]thioxanthene-14-one.

A one liter three neck round bottom flask was equipped with a mechanical stirrer, addition funnel, thermometer and condenser. To the flask was added 55 g of 3-[(2-aminophenyl)thio]-2-(1-isobutyl-3-methylbutoxy)-7H-benzo[de]anthracene-7-one and 400 g DMF. The reaction was cooled to 0° C. with a dry ice bath and 133 g con. HCl were added, keeping the reaction temperature below 10° C. While this addition was taking place, 8.4 g sodium nitrite were dissolved in 20 g water. The reaction mixture was cooled to 0° C. and the sodium nitrite in water added slowly, keeping the reaction temperature below 5° C. After completing the addition, the reaction was stirred for three hours while keeping the temperature at 0° C. or less.

Copper (II) sulfate (1.0 g) was added to the reaction and heating of the reaction mixture was begun. As the cyclization occurred, nitrogen gas was evolved and a mild exotherm occurred. The reaction mixture was heated to reflux and stirred well at reflux for three hours. The reaction mixture was cooled to 25° C. and then some of the DMF was removed using vacuum and heat. To the residue was added 300 g chloroform and the layers separated. The aqueous layer was extracted with another 300 g chloroform. The chloroform extracts were combined, washed tree times with 250 g deionized water. The solution of the crude product in chloroform was passed through a flash chromatography column using additional chloroform as the elutant. The product fractions were combined and the solvent removed on a rotary evaporator. To the dry residue was added 200 g hexanes and the solid filtered to collect the red solid product. The yield of 6-(1-isobutyl-3-methylbutoxy)-14H-anthra[2,1,9-mna]thioxanthene-14-one was 9.5 g. The melting point of the solid was 213–214° C. 13C NMR showed that the product was 90–95% pure and was the desired dye molecule.

Examples 4–7

Examples 4–7 were prepared by placing 60–100 mg of each of the compounds of Examples 1–3 and 6-methoxy-14H-anthra(2,1,9-mna)thioxanthene-14-one (described by Carlini et al.) in a vial with 5.0 ml acetone. The vials were allowed to stand at room temperature (RT) for 72 hours, at which time each vial had a substantial amount of solid dye remaining. Each vial was hand shaken and the solution was filtered using a 0.45 micron polytetrafluoroethylene (PTFE) filter commercially available from VWR Scientific Products, West Chester, Pa. under the trade designation "Acrodisc 13CR PTFE".

The amount of fluorescent dye in the saturated acetone solution was determined by measuring the major dye absorption band at 535 nm using a UV-Vis Spectrophotometer commercially available from Shimadzu Scientific Instruments, Inc., Columbia, Md. under the trade designation "Shimadzu model UV-2401PC". Dye concentrations were calculated by measuring the absorbance of the saturated acetone solution, and then diluting that solution until absorbance of the resulting solution was below 3. The dyes were assumed to have equal absorbance per mole. Using the dilution and an absorbance coefficient of 16,100 A/mol/L (coefficient obtained in acetone for the dye of Example 3) and assuming a Beer's Law relationship, the concentration of dye in each saturated solution was calculated and is set out in TABLE I The data in TABLE I show the improved solubility in acetone of Examples 4–6 relative to that of Example 7 [6-methoxy-14H-anthra(2,1,9-mna)thioxanthene-14-one].

TABLE I

| Ex. No. | Dye of Ex. No. | Dye Concentration in Acetone at RT (mg/ml) |
|---|---|---|
| 4 | 1 | 0.19 |
| 5 | 2 | 0.96 |
| 6 | 3 | 2.98 |
| 7 | 6-methoxy-14H-anthra(2,1,9-mna)thioxanthene-14-one | 0.06 |

Examples 8–10

Examples 8–10 were prepared with the compounds of Examples 1 and 2 and 6-methoxy-14H-anthra(2,1,9-mna)thioxanthene-14-one at a 0.2% loading in polycarbonate FCR-2407. Extrusion conditions for the polycarbonate were 260–304° C. using a single screw extruder. Optically transparent pressure sensitive adhesive with a liner on both sides of the adhesive was laminated to the 0.1 mm thick sheet of polycarbonate by removing one of the liners from the adhesive and then applying the exposed adhesive to the polycarbonate sheet with two passes of a roller using hand pressure.

The remaining liner was removed from the adhesive and the polycarbonate sheet construction was laminated to retroreflective sheeting commercially available from 3M under the trade designation "Scotchlite Diamond Grade LDP Reflective Sheeting Series 3970" (Scotchlite 3970) with two passes of a roller using hand pressure. The Scotchlite 3970 reflective sheeting had previously been laminated to a 7 cm wide by 28 cm long aluminum panel (6061T6 alloy with etch and desmut surface from Q Panel Company, Cleveland, Ohio) with two passes of a roller with hand pressure.

The daytime color of each article was measured using a Labsphere BFC-450 Bispectral Colorimeter commercially available from Labsphere, North Sutton, N.H. The daytime chromaticity (x,y), total luminance factor ($Y_T$), and fluorescence luminance factor ($Y_F$, which is a measure of the fluorescent properties of the article) calculated for the CIE D65 and the CIE 1931 observer are provided in TABLE II The data in TABLE II show that the articles of Examples 8–10 exhibited a bright fluorescent appearance as shown by the $Y_F$ values.

TABLE II

| Ex. No. | Dye of Ex. No. | x | y | $Y_T$ | $Y_F$ |
|---|---|---|---|---|---|
| 8 | 1 | 0.5232 | 0.3132 | 32.87 | 14.6 |
| 9 | 2 | 0.5336 | 0.2979 | 32.05 | 16.6 |
| 10 | 6-methoxy-14H-anthra(2,1,9-mna)thioxanthene-14-one | 0.6163 | 0.3025 | 28.24 | 16.15 |

Examples 11–16

Examples 11–16 were prepared with the compounds of Examples 1–2 and 6-methoxy-14H-anthra(2,1,9-mna)thioxanthene-14-one in polymethylmethacrylate (PMMA) resin at the wt.-% of dye shown in TABLE III. The samples were prepared by dry blending the dye with a medium impact modified grade PMMA resin commercially available from Ineos Acrylics Inc., Cordova, Tenn. under the trade designation "CP923". Films of 0.1 mm thickness were extruded through a single screw extruder with three heating zones set at 249° C. to 260° C. When visually inspected, the film with the 6-methoxy-14H-anthra(2,1,9-mna)thioxanthene-14-one at 1 wt.-% had particles of dye in the film, whereas the films with the dyes of Examples 1–2 had a uniform appearance with no undissolved dye seen even though for Example 13 the dye was present at a higher wt.-% loading. Examples 11 and 12 and Examples 13 and 14 had equal molar loadings of dye.

The resultant films were laminated to Scotchlite 3970 reflective sheeting on aluminum panels as described in Examples 8–10. Color values were measured as described in Examples 8–10 and the results set out in TABLE III. The data in TABLE III show that the articles of Examples 11–16 exhibited a bright fluorescent appearance as shown by the $Y_F$ values.

The data also show that articles prepared using the dye of Example 1 displayed higher fluorescence than those prepared with the 6-methoxy-12H-anthra(2,1,9-mna)thioxanthene-14-one, exhibited by the higher fluorescence luminance factor at equal molar loadings. The higher dye loadings of Example 13 and 14 show the effect of dye self quenching that leads to reduced fluorescence.

TABLE III

| Ex. No. | Dye of Ex. No. | Dye wt-% | X | y | $Y_T$ | $Y_F$ |
|---|---|---|---|---|---|---|
| 11 | 1 | 0.38 | 0.5923 | 0.3022 | 19.96 | 13.74 |
| 12 | 6-methoxy-14H-anthra(2,1,9-mna)thioxanthene-14-one | 0.3 | 0.6072 | 0.3117 | 17.02 | 11.64 |
| 13 | 1 | 1.27 | 0.6305 | 0.3008 | 7.80 | 4.97 |
| 14 | 6-methoxy-14H-anthra(2,1,9-mna)thioxanthene-14-one | 1.0 | 0.5723 | 0.3064 | 5.28 | 3.67 |
| 15 | 1 | 0.2 | 0.5210 | 0.3252 | 30.85 | 16.83 |
| 16 | 2 | 0.2 | 0.6064 | 0.3113 | 31.13 | 14.69 |

Examples 17–18

Examples 17–18 were prepared as described in Examples 8–10, except that the dyes of Examples 1 and 2 at a 0.2 wt.-% loading were independently incorporated into a copolyester resin. The copolyester resin was prepared using terephthalic and isophthalic acid in an 80/20 ratio and ethylene glycol in the conventional manner and analogous to the production of polyethylene terephthalate according to the method described in *Macromolecular Syntheses*, A Periodic Publication of Methods for the Preparation of Macromolecules, Collective Volume I, 1977, J. A. Moore, Editor, (John Wiley & Sons, New York; 1978);p. 17–21. The extrusion conditions for the copolyester were 254–260° C. using a single screw extruder and the resultant film thickness was 0.1 mm.

The resultant films were laminated to Scotchlite 3970 reflective sheeting on aluminum panels as described in Examples 8–10. Color values were measured as described in Examples 8–10 and the results set out in TABLE IV. The data in TABLE IV show that the articles of Examples 17–18 exhibited a bright fluorescent appearance as shown by the $Y_F$ values.

TABLE IV

| Ex. No. | Dye of Ex. No. | x | y | $Y_T$ | $Y_F$ |
|---|---|---|---|---|---|
| 17 | 1 | 0.5429 | 0.3056 | 22.83 | 11.70 |
| 18 | 2 | 0.5627 | 0.2785 | 19.91 | 12.77 |

Examples 19–21

Examples 19–21 were prepared by independently stirring 0.10 parts of the dyes of Examples 1 and 3 and 6-methoxy-14H-anthra(2,1,9-mna)thioxanthene-14-one in a clear vehicle solution of 64.8 parts Dowanol DPMA and 38.2 parts Paraloid B66.

The fluorescent dye solutions were coated on Scotchlite 3970 reflective sheeting using a #16 wire wound bar. The coating was air dried for 5 minutes and then dried in a 120° C. oven for 45 minutes. Color values were measured as described in Examples 8–10 and the results set out in TABLE V.

The data in TABLE V show that Example 21 was very dark in appearance in contrast to Examples 19–20 which contained the dyes of Examples 1 and 3 and had a bright fluorescent pink appearance. The improved solubility of the dyes of Examples 1 and 3 provided a more highly fluorescent article as indicated by the high $Y_F$ values of Examples 19–20.

TABLE V

| Ex. No. | Dye of Ex. No. | x | y | $Y_T$ | $Y_F$ |
|---|---|---|---|---|---|
| 19 | 1 | 0.4381 | 0.2980 | 30.10 | 11.09 |
| 20 | 3 | 0.4971 | 0.3113 | 33.17 | 17.05 |
| 21 | 6-methoxy-14H-anthra(2,1,9-mna)thioxanthene-14-one | 0.3977 | 0.3225 | 17.05 | 1.12 |

Examples 22–23

Examples 22–23 were prepared by independently stirring 0.18 g of the dye of Examples 1 and 3 into 65 g of a mixture composed of 42 wt.-% DIBK, xylol, and mineral spirit (1.7:2.3:1), 44 wt.-% of a polyvinyl chloride dispersion commercially available from PolyOne, Cleveland, Ohio under the trade designation "GEON 178" and 14 wt.-% of a polyacrylate commercially available from Ineos Acrylics Inc., Cordova, Tenn. under the trade designation "Elvacite 2013". Each mixture was allowed to stand at room temperature for one hour prior to knife coating onto a pre-sized paper substrate. Each coated substrate was placed in a 150° F. (66° C.) oven for 1.5 minutes, followed by a 300° F. (149° C.) oven for 1.0 minute and a 400° F. (204° C.) oven for 0.75 minute, resulting in a 0.04 mm thick fluorescent colored vinyl film.

The resultant films were laminated to Scotchlite 3970 reflective sheeting on aluminum panels as described in Examples 8–10. Color values were measured as described in Examples 8–10 and the results set out in TABLE VI. The data in TABLE VI show that Examples 22–23 exhibited a bright fluorescent appearance as shown by the $Y_F$ values.

TABLE VI

| Ex. No. | Dye of Ex. No. | x | Y | $Y_T$ | $Y_F$ |
|---|---|---|---|---|---|
| 22 | 1 | 0.5149 | 0.2762 | 23.82 | 12.31 |
| 23 | 3 | 0.4952 | 0.2609 | 24.21 | 12.92 |

Examples 24–27

Examples 24–27 were prepared as described in Examples 8–10, except that the dyes of Examples 1, 3, 6-(2-hydroxy-ethoxy)-14H-anthra(2,1,9-mna)thioxanthene-14-one (described by Carlini et al.) and 6-methoxy-14H-anthra(2,1,9-mna)thioxanthene-14-one were independently used at 0.2 wt.-% loading in an aliphatic polyester polyurethane resin commercially available from Huntsman Polyurethanes, West Deptford, N.J., USA under the trade designation "PN03.214". The extrusion conditions for the polyurethane were 154–191° C. and the resultant film thickness was 0.1 mm.

The resultant films were laminated to Scotchlite 3970 reflective sheeting on aluminum panels as described in Examples 8–10. Color values were measured as described in Examples 8–10 and the results set out in TABLE VII. The data in TABLE VII show that the articles of Examples 24–27 exhibited a bright fluorescent appearance as shown by the $Y_F$ values.

TABLE VII

| Ex. No. | Dye of Ex. No. | X | y | $Y_T$ | $Y_F$ |
|---|---|---|---|---|---|
| 24 | 1 | 0.5739 | 0.2692 | 17.46 | 11.83 |
| 25 | 3 | 0.5970 | 0.2886 | 17.66 | 11.62 |
| 26 | 6-(2-hydroxy-ethoxy)-14H-anthra(2,1,9-mna)thioxanthene-14-one | 0.6000 | 0.2756 | 14.71 | 10.09 |
| 27 | 6-methoxy-14H-anthra(2,1,9-mna)thioxanthene-14-one | 0.5989 | 0.2780 | 14.81 | 9.69 |

We claim:

1. An article comprising a polymer matrix and a compound of the formula

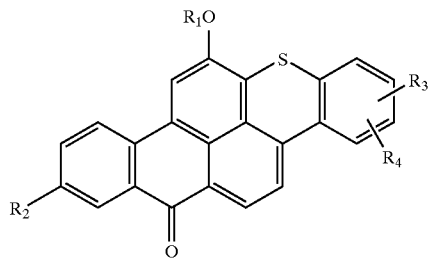

wherein $R_1$ is a straight chain alkyl group having from 5 to 22 carbon atoms or a branched chain alkyl group having from 3 to 22 carbon atoms;
$R_2$, $R_3$ and $R_4$ are each, independently, hydrogen or alkyl having from 1 to 4 carbon atoms.

2. The article of claim 1, wherein $R_2$, $R_3$ and $R_4$ in the formula are hydrogen.

3. The article of claim 2, wherein $R_1$ is a straight chain alkyl group having from 6 to 12 carbon atoms or branched chain alkyl group having from 3 to 12 carbon atoms.

4. The article of claim 2, wherein $R_1$ is a straight or branched $C_8$ or $C_9$ alkyl group.

5. The article of claim 1 wherein the fluorescence luminance factor is at least 3.

6. The article of claim 1 further comprising at least one additional colorant.

7. The article of claim 1 wherein the polymeric matrix comprises a polymer or polymer blend having a molecular weight greater than about 3,000 g/mole.

8. The article of claim 1, wherein the compound is about 0.01 wt-% to about 10 wt-% of the polymer matrix.

9. The article of claim 1, wherein the matrix comprises at least one of a polycarbonate, a polyester, a polyacrylate, a polymethyl-methacrylate, a polyurethane, polyvinyl chloride and a polyolefin.

10. The article of claim 1, in the form of a sheet having a thickness of about 10 microns to about 1000 microns.

11. The article of claim 10, wherein the sheet has retroreflective elements on one side.

12. The article of claim 1, wherein the polymer matrix is a thermoplastic polymer.

13. A laminate comprising:
(a) a sheet comprising:
  (i) a polymer matrix;
  (ii) a compound of the formula

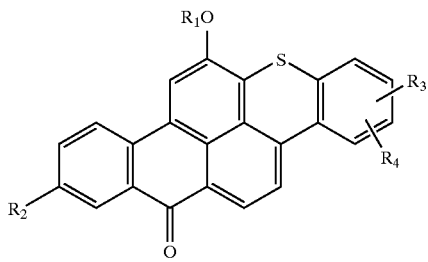

wherein $R_1$ is a straight chain alkyl group having from 5 to 22 carbon atoms or a branched chain alkyl group having from 3 to 22 carbon atoms;
$R_2$, $R_3$ and $R_4$ are each, independently, hydrogen or alkyl having from 1 to 4 carbon atoms; and
(b) a substrate wherein the sheet is disposed on the substrate to form a laminate.

14. The laminate of claim 13 wherein the fluorescence luminance factor is at least 3.

15. The laminate of claim 13 further comprising at least one additional colorant.

16. The laminate of claim 13, wherein the substrate is retroreflective.

17. The laminate of claim 13, wherein the polymer matrix is a thermoplastic polymer.

18. The laminate of claim 13, wherein $R_2$, $R_3$ and $R_4$ in the formula are hydrogen.

19. The laminate of claim 18, wherein $R_1$ is a straight chain alkyl group having from 6 to 12 carbon atoms or branched chain alkyl group having from 3 to 12 carbon atoms.

20. The laminate of claim 18, wherein $R_1$ is a straight or branched $C_8$ or $C_9$ alkyl group.

21. A pigment comprising in particle form:

(a) a compound of the formula

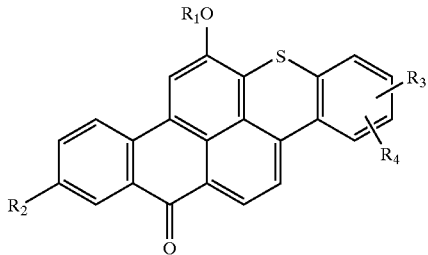

wherein $R_1$ is a straight chain alkyl group having from 5 to 22 carbon atoms or branched chain alkyl group having from 3 to 22 carbon atoms;

$R_2$, $R_3$ and $R_4$ are each, independently, hydrogen or alkyl having from 1 to 4 carbon atoms; and (b) a polymer matrix comprising at least one of a polycarbonate and a polyester, wherein the compound is incorporated into the polymer matrix.

22. The pigment of claim 21 further comprising at least one additional colorant.

23. The pigment of claim 21, further comprising microstructured surfaces on the pigment forming a retroreflective fluorescent pigment.

24. The pigment of claim 21, wherein the microstructured surfaces have a reflective coating thereon.

25. The pigment of claim 21, wherein the microstructured surfaces have a sealing member thereon.

26. The pigment of claim 21, wherein the pigment has an equivalent diameter between about 0.01 millimeter to about 5 millimeters.

27. The pigment of claim 21, wherein the compound comprises about 0.01 to about 2 wt-% of the pigment.

28. The pigment of claim 21, further comprising from about 0.1 to about 0.8 wt-% of a hindered amine light stabilizer.

29. The pigment of claim 28, wherein the hindered amine light stabilizer is a 2,2,6,6-tetramethyl piperidine.

30. The pigment of claim 21, further comprising retroreflective elements.

31. The pigment of claim 21, wherein the retroreflective elements comprise microspheres or microstructured elements.

32. The pigment of claim 21, wherein $R_2$, $R_3$, and $R_4$ in the formula are hydrogen.

33. The pigment of claim 32, wherein $R_1$ is a straight chain alkyl group having from 6 to 12 carbon atoms or branched chain alkyl group having from 3 to 12 carbon atoms.

34. The pigment of claim 32, wherein $R_1$ is a straight or branched $C_8$ or $C_9$ alkyl group.

35. An article comprising:

(a) a binder having a first major viewing surface; and (b) a pigment comprising, in particle form, (i) a compound of the formula

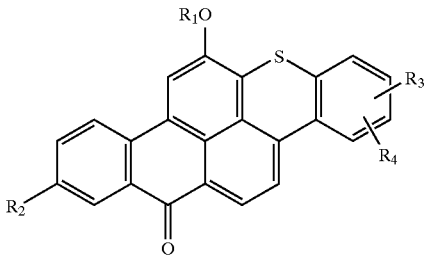

wherein $R_1$ is a straight or branched chain alkyl group having from 1 to 22 carbon atoms;

$R_2$, $R_3$ and $R_4$ are each, independently, hydrogen or alkyl having from 1 to 4 carbon atoms; and (ii) a polymer matrix comprising at least one of a polycarbonate and a polyester, wherein the compound is incorporated into the polymer matrix, and wherein at least some of the pigment particles are disposed on or in the binder so as to be visible on the first major viewing surface of the binder.

36. The article of claim 35 wherein the fluorescence luminance factor is at least 3.

37. The article of claim 35 further comprising at least one additional colorant.

38. The article of claim 35, wherein the binder is a thermoplastic or thermoset polymer, or a mixture thereof.

39. The article of claim 35, wherein the binder comprises at least one of a polyurethane, a polyacrylate, a plasticized polyvinyl chloride and a polyolefin.

40. The article of claim 35, wherein the binder further comprises fillers selected from glass beads, ceramic microspheres, anti-skid particles and inorganic powders.

41. The article of claim 35, further comprising:

a colored backing layer; and a layer comprising the pigment and the binder, wherein the backing layer is disposed adjacent the fluorescent layer.

42. The article of claim 35, wherein the pigment is disposed throughout the binder.

43. The article of claim 35, wherein $R_2$, $R_3$ and $R_4$ in the formula are hydrogen.

44. The article of claim 43, wherein $R_1$ is a straight chain or branched chain alkyl group having from 3 to 12 carbon atoms.

45. The article of claim 43, wherein $R_1$ is a straight or branched $C_8$ or $C_9$ alkyl group.

46. A coating composition comprising:

(a) a compound of the formula

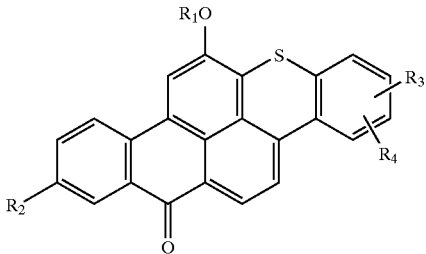

wherein $R_1$ is a straight or branched chain alkyl group having from 1 to 22 carbon atoms;

$R_2$, $R_3$ and $R_4$ are each, independently, hydrogen or alkyl having from 1 to 4 carbon atoms;

(b) a film-forming resin; and (c) a solvent.

47. The composition of claim 46, wherein the film-forming resin comprises at least one of an acrylic resin, a polyester resin and a vinyl resin.

48. The composition of claim 47, wherein the acrylic resin comprises a polymethylmethacrylate or a copolymer of methylmethacrylate and butylmethacrylate.

49. The composition of claim 46, wherein the solvent comprises dipropyleneglycol monomethyl ether acetate, toluene, methylisobutyl ketone, diisobutyl ketone, methylethyl ketone or mixtures thereof.

50. The composition of claim 46, wherein the compound is not less than about 0.01 wt-% of the film forming resin.

51. The composition of claim 49, wherein the solvent is dipropyleneglycol monomethyl ether acetate.

52. The composition of claim 46, wherein $R_2$, $R_3$ and $R_4$ in the formula are hydrogen.

53. The composition of claim 52, wherein $R_1$ is a straight chain or branched chain alkyl group having from 3 to 12 carbon atoms.

54. The composition of claim 52, wherein $R_1$ is a straight or branched $C_8$ or $C_9$ alkyl group.

55. A retroreflective article comprising:

(a) a retroreflective substrate; and (b) a coating composition according to claim 46 disposed as a coating on the retroreflective substrate and wherein the coating is substantially free of solvent.

56. The article of claim 55 wherein the fluorescence luminance factor is at least 3.

57. The article of claim 55 further comprising at least one additional colorant.

58. The article of claim 55, wherein the coating has a thickness of about 1 micron to about 250 microns.

59. An article comprising at least one color layer selected from a) a mixture of a polymer matrix and a compound of the formula

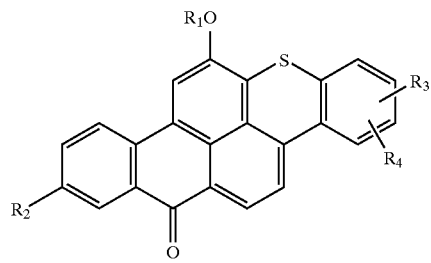

wherein $R_1$ is a straight chain alkyl group having from 5 to 22 carbon atoms or a branched chain alkyl group having from 3 to 22 carbon atoms;

$R_2$, $R_3$ and $R_4$ are each, independently, hydrogen or alkyl having from 1 to 4 carbon atoms and wherein said mixture is in the form of a sheet or pigment particle; and b) a coating composition comprising:

(a) a compound of the formula

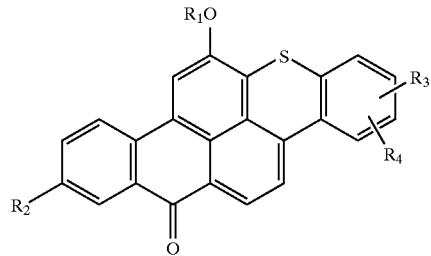

wherein $R_1$ is a straight or branched chain alkyl group having from 1 to 22 carbon atoms;

$R_2$, $R_3$ and $R_4$ are each, independently, hydrogen or alkyl having from 1 to 4 carbon atoms and a film-forming resin.

* * * * *